UNITED STATES PATENT OFFICE.

MARIE EUGÈNE PAUL AUDOUIN, OF PARIS, FRANCE.

IMPROVEMENT IN COMPOSITION FOR LINING PUDDLING AND OTHER FURNACES.

Specification forming part of Letters Patent No. 180,822, dated August 8, 1876; application filed May 5, 1876.

*To all whom it may concern:*

Be it known that I, MARIE EUGÈNE PAUL AUDOUIN, of Paris, France, civil engineer, have invented a new or Improved Refractory Composition or Material for Lining Puddling and other Furnaces; and I do hereby declare that the following is a full, clear, and exact description of the same.

My invention relates to the application and use for lining puddling and other furnaces of a composition or substance calculated to more effectually resist the action of oxide of iron than any other material heretofore employed for the purpose. This material is oxide of chromium, which is capable of resisting the very highest temperatures employed in furnaces and laboratories—such as the Siemens furnace and furnaces heated by dead-oils—and is also proof against the action of oxide of iron at the highest degrees of heat.

There is no danger of the oxide being reduced under the ordinary conditions of working, and, moreover, the presence of a small quantity of chromium would not affect the quality of the iron. This oxide may also be utilized in the manufacture of fire-proof blocks to be exposed to the action of furnace-cinder and scoria, but with less advantage, as, by the action of certain principles, more especially potash, soda, and lime, chromates are eventually found.

Although oxide of chromium is a rare substance, and of high price, yet the raw material rich in chromium (viz., chrome ore) is formed in abundance, and in a great number of cases I may employ the impure oxide of chromium allied with oxide of iron in the condition it is found in the ore, which is selected carefully, using only that containing at least forty-five to fifty per cent. of oxide of chromium. This material may, as well as the oxide of chromium, be employed in blocks or of other molded forms, produced by pulverizing or reducing the material to the desired degree of fineness, molding, and then burning the same, if needed. The material may be use either alone or combined with a small percentage of binding substances—such as aluminous and other earths, alumina or silicate of alumina, and others. Oxide of chromium may also be employed with advantage for molds into which metal is run from Bessemer and Martin furnaces as a substitute for the more or less silicious matters usually employed, which combine with the metal at these high temperatures, and also in lieu of cast-iron molds, which are expensive, and last but a short time. Oxide of chromium, whether pure or as found in the ore, may also be employed in furnaces, pots, and retorts used in the manufacture of zinc-white, for linings and other parts of furnaces, vaults, and hearths of furnaces used in the reduction, fusion, or oxidation of metals, more especially lead, copper, and silver, for making laboratory-crucibles, tuyeres, muffle-pots, and hearths in common glass-works, and also gas-retorts.

The following are the advantages resulting from the use of the above-mentioned material: It will resist the highest temperatures, and is uninfluenced by reducing or oxidizing flames. When properly prepared, it is not liable to contract, and resists sudden variations of temperature better than any aluminous or silicious material. Owing to the closeness of its grain and its chemical properties, it resists in the highest degree the action of fluxes and oxides. It also resists alike the action of heat and cold, as well as friction and shocks.

I claim—

A refractory material for fire-surfaces, consisting essentially of oxide of chromium, prepared in the manner and for the purpose substantially as described.

MARIE EUGÈNE PAUL AUDOUIN.

Witnesses:
  ROBT. M. HOOPER,
  F. ORET.